United States Patent [19]
Franklin et al.

[11] Patent Number: 5,388,992
[45] Date of Patent: Feb. 14, 1995

[54] METHOD AND APPARATUS FOR TACTILE TRANSDUCTION OF ACOUSTIC SIGNALS FROM TELEVISION RECEIVERS

[75] Inventors: David Franklin; Michael Wollowitz; John Simpson, all of Somerville, Mass.

[73] Assignee: Audiological Engineering Corporation, Somerville, Mass.

[21] Appl. No.: 717,665

[22] Filed: Jun. 19, 1991

[51] Int. Cl.⁶ .................... H04R 25/00; G09B 21/00
[52] U.S. Cl. .................................. 434/114; 434/112; 340/407.1
[58] Field of Search ............... 434/112, 113, 114, 116, 434/185; 340/825.19, 407, 384 R, 407.1; 341/21, 27; 381/68, 150, 151, 162, 191, 205

[56] References Cited

U.S. PATENT DOCUMENTS

| | | | |
|---|---|---|---|
| 4,250,637 | 2/1981 | Scott | 434/114 |
| 4,310,315 | 1/1982 | Frank et al. | 434/112 |
| 4,581,491 | 4/1986 | Boothroyd | 434/114 |
| 4,685,448 | 8/1987 | Shames et al. | 434/185 |
| 4,728,934 | 3/1988 | Pfänder et al. | 434/114 |

FOREIGN PATENT DOCUMENTS

| | | | |
|---|---|---|---|
| 0653197 | 12/1985 | Switzerland | 434/112 |
| 2044977 | 10/1980 | United Kingdom | 434/112 |
| 9116694 | 10/1991 | WIPO | 434/114 |

OTHER PUBLICATIONS

Franklin, David, "Tactileaids: What are they?" Hearing Journal, May 1988.

Primary Examiner—Jessica J. Harrison

[57] ABSTRACT

Inexpensive wideband transducers convert low frequency components (i.e., approximately 50 Hz through 800 Hz) of an audio signal to mechanical vibrations at the same frequencies so that the vibrations may be perceived at the user's skin, typically at a hand or finger. The transducer may be a small permanent magnet moving coil loudspeaker with most of the diaphragm cone removed to minimize soundwave generation, or it may be a small d.c. or stepping motor arranged to have its drive shaft rotated in alternate directions through small angles corresponding to signal amplitude. Vibrations may be applied to the user's hand through a hand-held case vibrating with the motor, or to a finger via a contactor extending outside the case from the motor or loudspeaker. The transducer has particular utility in conjunction with closed captioned in television programs to enhance appreciation of speech therein while also training the user in utilizing the transducer. One or more fixed frequency transducers may additionally be employed vibrations at a single frequency representing all of the higher frequency components in the audio signal.

23 Claims, 4 Drawing Sheets

METHOD AND APPARATUS FOR TACTILE TRANSDUCTION OF ACOUSTIC SIGNALS FROM TELEVISION RECEIVERS

This invention was made with government support under grant awarded by the National Institute of Health. The government has certain rights in the invention.

BACKGROUND OF THE INVENTION

1. Technical Field

The present invention relates broadly to improvements in tactile sensing of acoustic and audio signal for hearing impaired persons. The invention has particular, although not exclusive, utility in enhancing the ability of hearing impaired persons to enjoy the audio portion of television signals.

2. Discussion of the Prior Art

Tactile devices for the deaf have been studied for approximately sixty years, and within the last eight years have been produced as commercial items. The essential concept embodied in all of these devices is to convert sound signals into vibrations that can be felt on the skin via the tactile sense. Naturally enough, the greatest emphasis has been on the ability to recognize speech sounds, although the practical value of recognizing various background sounds, such as bells, footsteps and so on, are also well appreciated. Since the tactile sensory system is unable to perceive vibrations much above 800 to 1000 Hz, and since significant input from signals to at least 4000 Hz is required to impart important speech data, a significant portion of the research and development work in this field has addressed methods for processing sound signals such that information from the higher frequencies can be transmitted to a user. Virtually all work in the field has focused on wearable devices which can be used on a more or less continuous basis; accordingly, a further constraint has been that the methods chosen result in small, cosmetically acceptable designs. Using these guidelines, the kinds of systems that have evolved all use small skin transducers, worn either on the wrist, chest or around the back of the neck. While it is well known that placing the transducers somewhere on a hand yields very good perceptual results, these locations are avoided for reasons relating to utility. Typically these transducers are resonant at a single frequency, usually 250 Hz as this is the most sensitive frequency for the tactile sense, and processing methods are employed that encode the desired signals at this rate. In the more advanced systems a number of such transducers are used, each being assigned to a different portion of the acoustic frequency band and worn at a respective position on the skin. Thus, in these systems, the incoming sound signal is separated by a processor into spectral segments, each segment being represented at a respective location on the skin as a 250 Hz signal with a varying time envelop and intensity according to the spectral content of the original signal.

The most advanced of these so-called "multiple channel" tactile devices currently available use seven such transducers arranged side by side with channels divided to cover the sound frequency range from 200 Hz to 7000 Hz, divisions being selected according to data on vowel frequencies commonly known in the speech discipline. The processing arrangement permits no more than two transducers to be actuated at the same time. It has been found that this method is desirable both to provide clarity of perception and to conserve battery life.

The reason for using resonant transducers is that they are more efficient than wideband transducers, at least as regards presently available technology. This, in turn, allows compact battery supplies to provide reasonably long operation with attendant cosmetic acceptability, but only at the cost described below.

It has been recognized that wideband transducers allow more easily perceived patterns with richer information content to be applied to the skin. In particular there are certain sound information components, notably voicing data in speech and attack waveform data in music, that are better represented by direct presentation of the unprocessed signals for the lower frequency range of the incident sound signal. This is true for that portion of these signals lying between about 50 Hz to 800 Hz; frequencies above this tend to be so dimly perceived by the tactile sense that there is little if any information communicated without some kind of encoding being used, such as the transducer location encoding described above.

It may be that improved perception could be obtained with a hybrid system using a similar multiple channel scheme wherein the lower frequency channels use no encoding, being excited directly by the lower spectral portion of the original sound signal, and only the upper band spectral components are encoded as described above. However, the technical methods for obtaining such a system in wearable form are not currently available in a configuration that also meets cosmetic requirements.

On the other hand, if one relaxes the cosmetic requirements, as would be appropriate for the intended uses of the present invention, then broadband transducers such as loudspeakers or small motors, as described hereinbelow, provide a means for supplying the desired direct tactile representations of lower frequency sounds.

In order to provide a frame of reference, it is desirable to note the specifics of the narrowband transducers currently used in the tactile field. A typical unit is approximately one inch long by 0.5 inch thick by 0.7 inch wide and weighs about seven grams. Its low weight and flat configuration is appropriate for the usual methods of mounting. Since all signals applied to such a transducer are encoded at a single frequency, typically 250 Hz, requirements for bandwidth are only related to the required response time. A well designed unit follows waveform changes at better than a 20 msec rate, adequate for virtually all speech sounds and all environmental sounds of interest. For such a device a typical peak driving energy to obtain maximum perceptual feel is on the order of 350 mw. It has been found over a period of years of actual use that the average duty cycle for these kinds of systems is on the order of 0.2. Accordingly, for a wearable system using one such transducer, the expended energy/hour is on the average about 70 mwatt-hours. A typical rechargeable battery pack used to power these devices, constrained in size according to the usual cosmetic considerations, stores about 1600 mwatt-hours. Hence, as is verified in many thousands of hours of actual use, a system using one such transducer will operate, on the average, for about twenty-three hours between charges. Generally, the decrease in hours of operation between charges does not follow linearly with an increasing number of transducers because, depending on design parameters, it is not true that all transducers in a system have the same duty cycle. For the seven channel device mentioned previously, where only two transducers at most are activated simultaneously, the time of operation between charges is approximately 15 hours.

In contrast, a typical mass-produced small motor requires about 1.5 watts in the application mode described herein to elicit the same perceptual intensity; it weighs about forty grams and has a cylindrical configuration typically on the order of one inch in diameter and one inch in length. It is clear that neither the configuration nor the power requirements lend themselves to application in a wearable form and that the weight also mitigates against this use. However, for a hand-held or hand-contact application in which larger size is allowable and hence a larger space can be allocated for the battery pack, the use of such small motors is not precluded. If loudspeakers are utilized, they require only 350 mw to achieve the same level drive for the applications described herein; however the loudspeakers are typically even larger and heavier than the small motors. Again, for hand-held or hand-contact applications this larger size and weight is not objectionable.

From the foregoing it will be appreciated that the present invention is intended to teach the use of small mass-produced motors or loudspeakers in tactile transducers for the deaf and hearing impaired in those applications where large size and low efficiencies, as compared to the usual tactile transducers, are not serious detriments. In particular, but not exclusively, this would apply to transducing television audio signals whether or not accompanied by captioning.

The present invention has particular, but not exclusive, utility in conjunction with television programming incorporating closed captioning or similar techniques employed to provide titling on the video screen to represent spoken words in the audio signal. The closed captioning titling technique is described and defined in Report No. E-7709-C, revised May 1980, by the Public Broadcasting Service. The disclosure in that report is expressly incorporated herein. Typically, a closed captioning decoder processes the closed captioning signal that is included in line twenty-one of the NTSC video signal. Decoding results in titling that is overlayed on the television screen, the titling content corresponding to speech in the audio portion of the received television signal. The present invention, by providing a low cost wideband transducer that can be used in conjunction with closed captioning, not only enhances appreciation of television programs for hearing impaired persons; it also permits such persons to be trained in the use of the transducers since the speech signals being tactually transduced are simultaneously viewed as titling on the television screen.

OBJECTS AND SUMMARY OF THE INVENTION

It is therefore, a primary object of the present invention to enhance a deaf or hearing impaired person's appreciation and enjoyment of television by means of a hand-held or hand-contact tactile device imparting a vibratory signal containing broadband television signal audio information over a bandwidth from about 50 Hz to about 800 Hz in direct form without any frequency translation. It is another object of the present invention to provide such device in the form of a small inexpensive mass-produced electric motor or loudspeaker driven directly by the sound signal via an appropriate electronic driving circuit. It is also an object of the invention to encode only the higher frequencies in the sound signal in order to provide tactile vibrations with a fixed carrier frequency such as 250 Hz.

According to the present invention, the tactile signals supplement other sources of sound information available from a television set, such as text captioning appearing on the screen, speech reading from the visual image and residual hearing assisted by hearing aids or some other means. Coupling to the tactile device from the sound output of the television set may be via: direct coupling to an output jack contained on the television set; an infrared or frequency modulated signal coupled from the television set via an appropriate transmitter/receiver pair, either as part of the tactile system or coupled to the tactile system; or an internal microphone provided as part of or plugged into the tactile system.

A further primary object of this invention is to enable a deaf or hearing impaired person to learn to recognize speech and other sounds cutaneously through the tactile modality during such periods as he might use the described tactile device while watching television and using the device. Specifically, use of such a device while watching television not only improves appreciation of the television programming material, but also improves skill with the tactile modality; it thereby serves as a training method for deaf and hearing impaired individuals whose daily use of tactile devices is a primary means for obtaining information about the world of sound, both as regards speech information and environmental sound information.

It is a further object of this invention to provide a cutaneously tactile device for use as a means of appreciating both speech and non-speech sounds generated from sources other than television sets, whereby the device serves as a communication device and an environmental sound awareness device in contexts other than as an adjunct to its use with television sets.

A still further object of the present invention is to provide an inexpensive and effective means for enabling a deaf or hearing impaired person to cutaneously perceive vibrations in the frequency band between 50 and 800 Hz in such a manner as to assist his appreciation of television programming materials and other sound information while holding a tactile transducer or transducers in his hand or against some other portion of his body, wherein low frequency vibrations in the range of approximately 50 to 800 Hz are provided by a small inexpensive mass-produced electric motor or loudspeaker.

In accordance with the present invention, tactual vibratory signals in the frequency range between about 50 Hz and 800 Hz are provided by a loudspeaker or small inexpensive mass-produced electric d.c. or stepping motor responsive to an audio signal derived from sound events in the aforesaid frequency range. Driving signals for d.c. and stepping motors are usually of one polarity only, resulting in motor rotation in one direction (i.e., continuously in the case d.c. motor, step-wise in the case of stepping motors). In the present invention the alternating audio input signal instead causes the motor to reverse its direction and magnitude of rotation in accordance with the polarity and magnitude of the input driving signal. As a consequence, the motor rotor rocks back and forth around a more or less fixed angular position with a rate and magnitude proportional to the frequency and magnitude of the said sound signal.

Whether a motor or a loudspeaker is employed to transduce the audio signals, the transducer effectively converts audio signals in the 50 Hz to 800 Hz range to cutaneously perceived vibrations at those same frequencies.

In one preferred embodiment of this invention a hand-held housing includes the transducer assemblies, the electronics, the interconnect jack, the batteries and possibly a microphone, although in order to eliminate the possibility of feedback, the microphone, if used, is best implemented via a remote unit plugged into the interconnect jack.

In an alternative preferred embodiment the housing is not hand-held but is placed instead on a surface and the hand of the person using the device is placed on it. In either of these embodiments the transducers may be isolated from the mass of the housing, or from the massy parts of the housing and contents, in order to improve coupling efficiency and increase the amount of motion of the transducer assemblies.

In use, the transducer is plugged into a reception mechanism such as a remote microphone, the output jack from an infrared or frequency modulated receiver receiving the sound channel from the television set, or directly into an audio output jack on the television set. An appropriate interconnect cord of suitable length is employed as necessary. The deaf or hearing impaired user thus tactually receives information about the sound events in the television program being watched.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein like reference numerals in the various figures are utilized to designate like components, and wherein.

DESCRIPTION OF THE PREFERRED EMBODIMENTS

Figure 1:
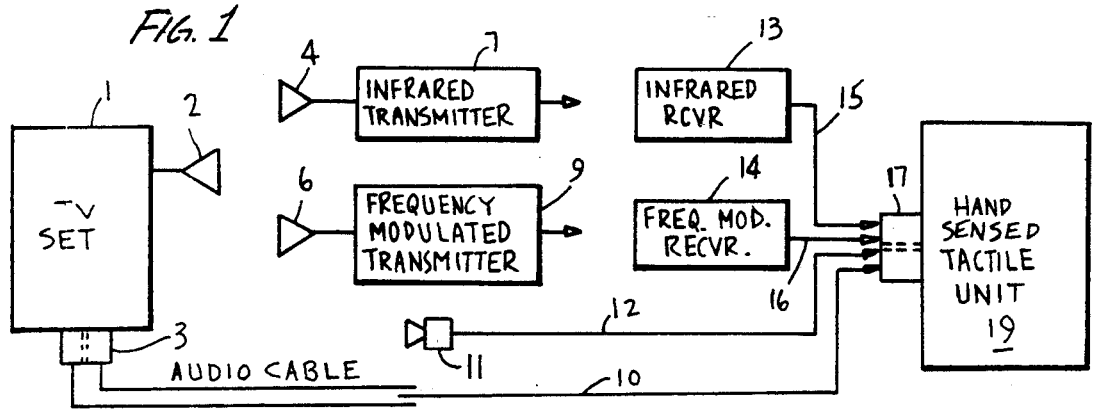
FIG. 1 is a functional system block diagram of a preferred embodiment of the present invention employed to transduce sound information from a television receiver.

Referring specifically to FIG. 1 of the accompanying drawings, a preferred embodiment of the invention is shown in the context of supplementing the appreciation of sound accompanying a received television signal. What is shown is a television set 1 providing two audio output signals and having an audio output jack 3 and a loudspeaker 2, either of which can be used as a sound source for a hand-held tactile unit 19 having an input audio jack 17. Depending on the particular application, the audio input jack 17 of tactile unit 19 may receive the television audio signal from: a microphone 11 for picking up the acoustic signals from speaker 2 and coupled by cable 12 to jack 17; a direct audio cable 10 between jacks 3 and 17; FM Receiver 14 via its output cable 16; or infrared (IR) Receiver 13 via its output cable 15. In the case where either IR Receiver 13 or FM Receiver 14 is employed, it receives input signal from IR Transmitter 7 or FM Transmitter 9, respectively, which in turn receives its audio input signal from either a respective microphone 6 or 4 via loudspeaker 2 or, alternatively, directly from audio cable 10, if the receiver is equipped to receive direct electrical signals as is often the case. Regardless of the means of coupling, the television audio signal is delivered from the television set to the input electronics of the hand-held or hand-contacted tactile unit 19 for the purpose of enhancing the user's appreciation of the auditory program material. Any variations in the coupling methods as may be afforded by different technologies or coupling mechanisms are considered to fall within the scope of the present invention.

As described above, television set 1 may be equipped with a closed captioning decoder that produces titling on the television screen corresponding to speech in the audio portion of the received television signal. A hearing impaired person can thusly view the speech being simultaneously transduced to tactile signals at unit 19. The person is thereby able to see the words represented by the sensed tactile sensations and become familiar with the meanings of those sensations. Once the person is trained in using unit 19, the unit may be used independently of closed captioning to enhance appreciation of television audio signals as well as general speech.

Figure 2:
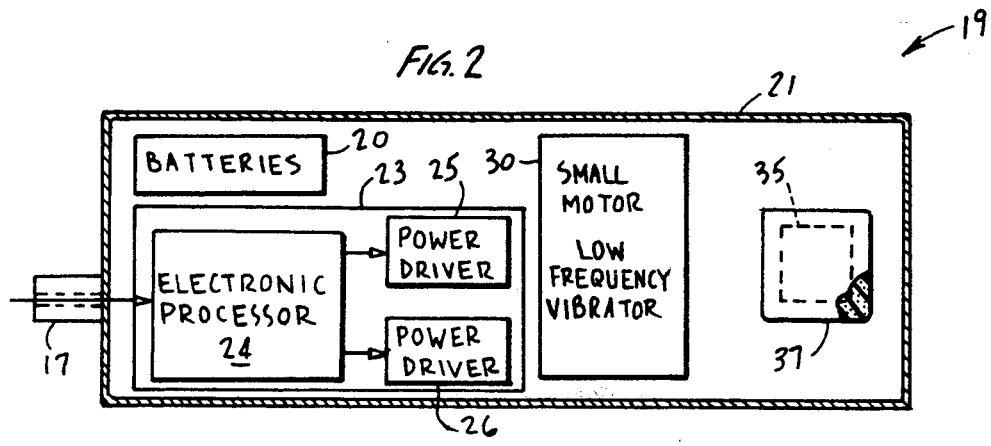
FIG. 2 is a block diagram of the hand-held unit in the system of FIG. 1.

FIG. 2 illustrates details of tactile 19 unit shown in FIG. 1. A housing 21 has at one end the audio input jack 17. The shape of housing 21 is chosen to be conveniently held in one hand with, in the preferred method, the end having audio input jack 17 nearest the wrist. At this end is a compartment to hold batteries 20, preferably of the rechargeable type, and a circuit board 23 on which is assembled electronic processor 24, a low frequency power driver 25 and a high frequency power driver 26. The output signal from the low frequency power driver 25 is coupled to a small motor 30, and the output signal of the high frequency power driver 26 is coupled to a high frequency transducer 35, via suitable wiring. As shown, the high frequency transducer 35 is suspended away from housing 21 by means of a gasket 37 acting to isolate transducer vibrations from those of the housing. In contrast, the small motor 30 is rigidly attached to housing 21 such that its vibrations are directly coupled to the housing and thence to the tactile sense via the skin on the user's hand. In the preferred method of use, the palm of the user's hand is wrapped around housing 21 with the finger tips placed on the surface of high frequency transducer 35. Tangential rotary low frequency vibrations are coupled to housing 21 from small motor 30 while the high frequency transducer 35 vibrates normal to the surface of housing 21, but isolated from it by suspension gasket 37. The user is able to differentiate between the two vibration sources on his skin because the high frequency vibrations are near his finger tips while the low frequency vibrations are applied over the entire front of his hand. Additionally, the perceptual experiences from the two channels differ because the low frequency vibrations from small motor 30 have a complex waveform consisting of all low frequencies while the vibrations from transducer 35 are at a fixed frequency with a nearly constant amplitude. These differences in signal content between the two transducers 30 and 35 are illustrated more clearly in FIG. 3.

Figure 3:
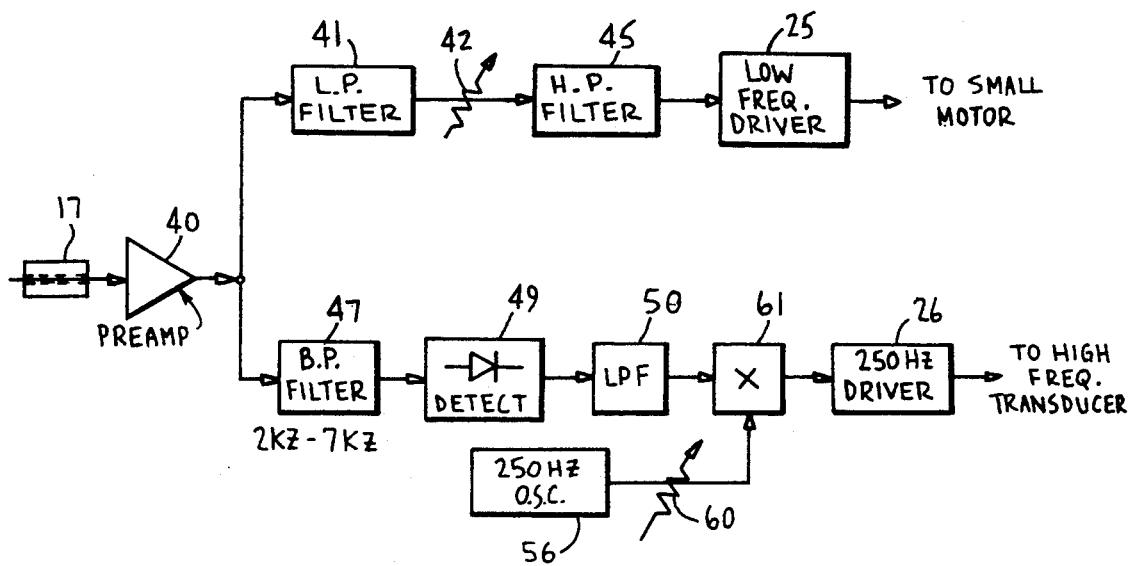
FIG. 3 is a circuit block diagram of the electronics processor employed in the unit of FIG. 2.

Referring to FIG. 3, the circuitry on circuit board 23 (FIG. 2) receives an audio input signal through input jack 17 to be amplified by preamplifier 40. The amplified signal is divided into two channels, one consisting of only low frequency components (e.g., below 1 KHz) separated by a low pass filter 41 while the high frequency channel is established by a bandpass filter 47 having a typical passband of 2000–7000 Hz. In the low frequency channel a variable attenuator 42 permits adjustment of the signal intensity, after which a band-shaped highpass filter 45 provides pre-emphasis to take into account the relatively low efficiency of the small motor 30 as a transducer at higher frequencies. The shape of the amplitude versus frequency characteristic of filter 45 depends on the characteristics of both motor 30 and the user's skin characteristics. The output signal from filter 45 is fed to low frequency driver 25 and thence to small motor 30. Thus, it is seen that the small motor is driven directly by the low frequency components of the audio signal.

In contrast, the high frequency signal components are detected by detector 49 after filter 47 and then low pass filtered by filter 50 to recover the signal amplitude without regard to the detected frequency components, other than that these components must be 2000 Hz or greater. This amplitude function is multiplied in multiplier 61 by a 250 Hz signal from oscillator 56. The amplitude of the 250 Hz signal may be adjusted by attenuator 60. The modulated output signal from multiplier 61 is applied to a signal amplifier or driver 26 to excite the high frequency transducer 35.

It will be appreciated that, while the low frequency motor 30 receives low frequency signals from the original sound source modified only linearly by filtering, the high frequency transducer 35 receives only a 250 Hz signal whose amplitude is related to the average amplitude of the original sound signal components between approximately 2000 Hz and 7000 Hz. The purpose of leaving a frequency gap between the top of the low channel and the bottom of the high channel is to better define the differences between the signals. It has been found in practice that this technique gives rise to the best use of the upper channel if only one transducer is used to represent that channel. While not a critical requirement, in the preferred embodiment this approach is utilized.

Figure 4A:
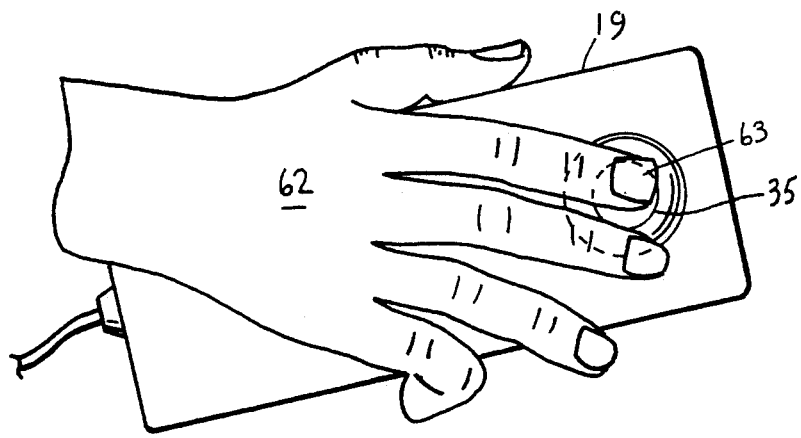
FIG. 4A is a top view in plan showing one hand-held embodiment of the present invention and the hand of a user thereof.
Figure 4B:
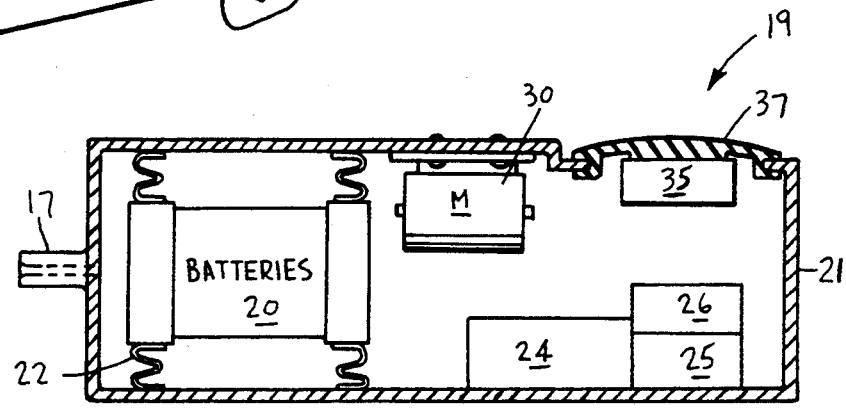
FIG. 4B is a partially diagrammatic side view in section of the hand-held embodiment of FIG. 4A.

FIG. 4A illustrates a hand 62 holding tactile unit 19, the tip of a forefinger 63 being in contact with the high frequency transducer 35 while the remainder of the front of the hand grasps the unit. The interior of unit 19 is illustrated in FIG. 4B wherein the batteries 20 are shown mechanically isolated from the housing structure or case 21 by means of a suspension 22, or the like, while the small motor 30 is rigidly attached to the housing. By isolating the heavy batteries from the housing, the excursion magnitude of the housing in response to vibrations of motor 30 may be increased. The high frequency transducer 35 has a suspension 37 for the purpose of isolating the transducer vibrations from those of housing 21. Also illustrated in FIG. 4B is the electronics assembly 24, 25 and 26.

Figure 5B:
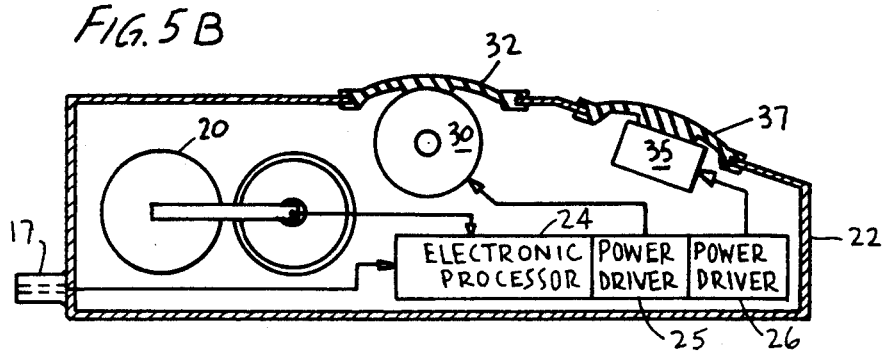
FIG. 5B is a partially diagrammatic side view in section of the embodiment of FIG. 5A.
Figure 5A:
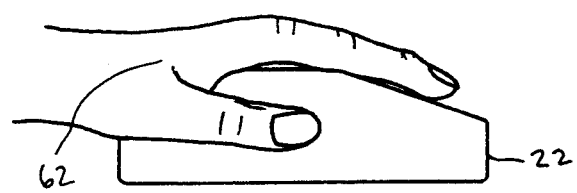
FIG. 5A is a side view in elevation of another embodiment of the present invention, adapted to be placed on a surface, and showing the hand of a user thereof.

FIGS. 5A and 5B illustrate an embodiment of the invention not designed to be hand-held but instead placed on a surface during use. In this design the user's hand 62 is placed on housing 22 which, in turn, rests on a support surface. Small motor 30 is isolated from the housing 22 by a suspension 32, and high frequency transducer 35 is likewise isolated by its suspension 37. In this embodiment the batteries 20 need not be isolated from the case 21.

Figure 6:
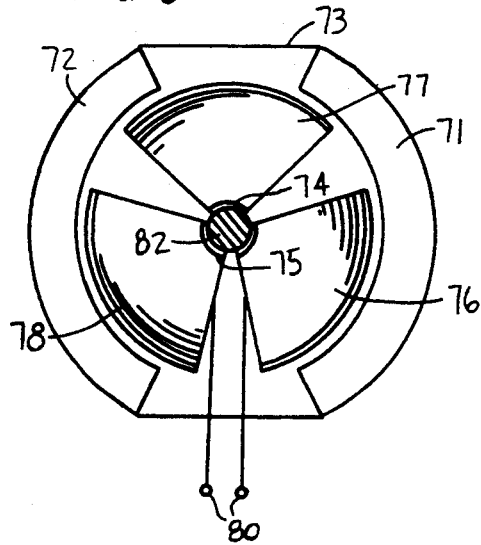
FIG. 6 is a view in plan of a d.c. motor employed as a low frequency wideband transducer in accordance with one embodiment of the present invention.

FIG. 6 is a diagram of the low frequency transducer realized as a permanent magnet direct current motor having magnets 71 and 72 mounted on its case 73 with a three-pole rotor and windings 76, 77 and 78 to receive an input driving signal at terminals 80. This signal is coupled to the windings 76, 77 and 78 via brushes 74 and 75 through commutator 82. Unlike the usual operation mode of a direct current motor, the alternating phases of the signal cause the rotor to vibrate about its center axis in a rotational motion wherein the average angular position remains constant, and wherein the rate and amplitude are proportional to the driving signal frequency and amplitude, respectively. The total mass of the rotor assembly 76, 77, 78 and 82 is comparable to that of the stationary case assembly 71, 72, 73, 74 and 75; therefore, the desired vibration of the latter is significant. Although a three-pole motor is shown, in general, for the rocking motion inherent to this kind of motor operation, the greater the number of poles, the more efficient the operation. In the preferred embodiment, cost is an important consideration and the least expensive motors tend to have no more than three poles. In alternate configurations, however, where efficiency is a more important parameter, trade-offs of cost against efficiency are appropriate.

Figure 7A:
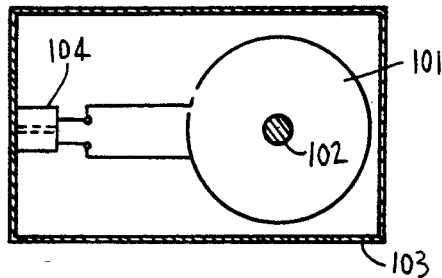
FIG. 7A is a top view in section of a conventional variable reluctance tactile transducer of the type used for a high frequency channel in the transducer embodiments of the present invention.
Figure 7B:
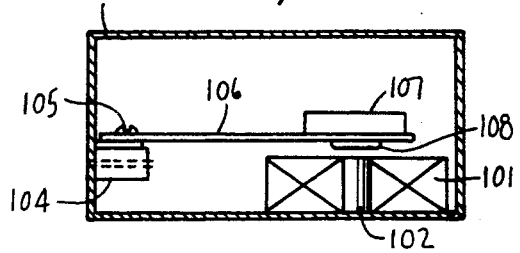
FIG. 7B is a side view in section of the transducer of FIG. 7A.

FIG. 7A and 7B illustrate a conventional variable reluctance transducer. A housing 103 is rigidly attached to a contained coil 101 surrounding a soft iron center slug 102. The coil is connected to a miniature jack 104 for receiving an input signal from the high frequency driver 26 (FIG. 3). Above coil assembly 101 and 102, and cantilevered from the end of housing 103, is a beam 106 secured with a screw 105 to the housing. At its distal end the beam has an attached mass 107 on one side and a magnet 108 on the other side configured so that magnet 108 is directly over coil 101 and its included iron slug 102. When excited by a 250 Hz signal, the beam assembly 106, 107 and 108 vibrates above the coil assembly 101 and 102 and imparts a similar vibration to the case 103. Hence, when the transducer unit is pressed against the user's skin, this vibration is imparted to the user's tactile sensory system.

Figure 8:
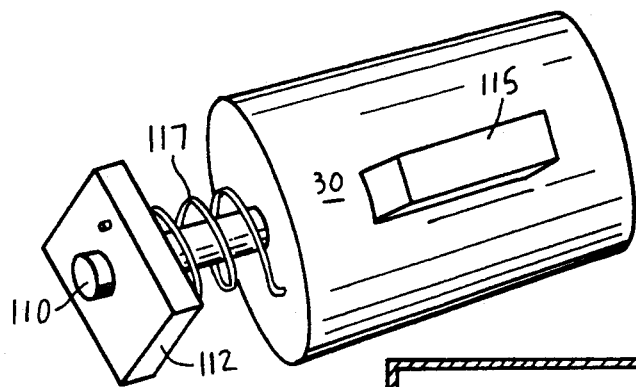
FIG. 8 is a view in perspective of another small motor modified in accordance with the present invention to function as a low frequency wideband transducer.

FIG. 8 shows a motor 30 and simple means by which its mechanical vibratory characteristics can be modified. A mass 112 is rigidly attached to the motor drive shaft 110 to effectively increase the mass of the rotor. Another mass 115 is rigidly attached to the motor housing to effectively increase the mass of the stator and housing. Torsion spring 117 is attached between the motor housing and shaft 110 to effectively increase the spring constant between the rotor and stator or, alternatively and at the same time, to define the rest or zero displacement angle of the rotor with respect to the stator. Any or all or any combination of these or other like means may be used as required to adjust the dynamics of the motor when used in the described application.

Figure 9:
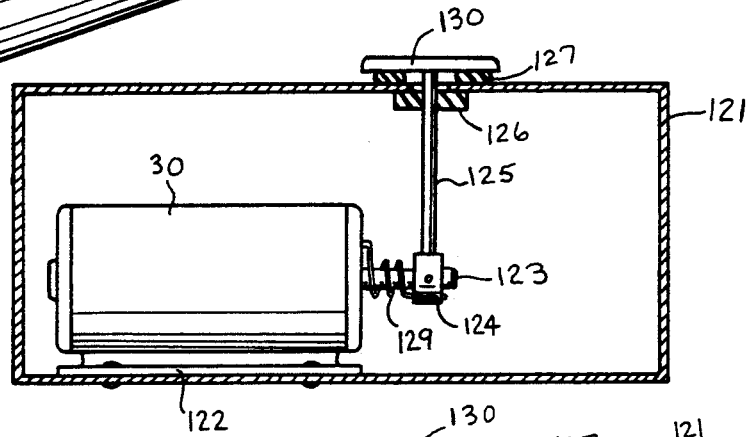
FIG. 9 is a side view in section of another embodiment of the present invention wherein a small motor is employed to reciprocate a contact pad or platform to provide tactile vibration.

Another embodiment of a low frequency transducer of the present invention is illustrated in FIG. 9 to which specific reference is now made. Small motor 30 is enclosed in housing 121 and is rigidly attached to the housing by mounting structure 122. A coupling sleeve 124 is concentrically secured about the motor drive shaft 123 with a rigid connection so as to rotate with the drive shaft. Vibration transmission rod 125 has a proximal end secured to coupling sleeve 124 and extends radially therefrom through an opening in housing 121. Rod 125 is a rigid member that rotates with drive shaft 123 about the drive axis in a plane perpendicular to the plane of the drawing in FIG. 9. A skin contactor pad 130 is fixed to the distal end of rod 125 outside housing 121. At the housing opening there are plural soft rubber gaskets 126, 127 surrounding rod 125 at respective sides of the housing wall to serve as stabilizers for the rod, as dust covers, and as mechanical constraints to prevent damage to the drive mechanism including motor 30, drive shaft 123 and rod 125. In addition, the gaskets hold the skin contactor pad 130 in proper position. Torsion spring 129 is attached between the body of motor 30 and drive shaft 123 (or coupler sleeve 124) to provide a desired spring constant for the drive arrangement.

Rotation of drive shaft 123 is never more than a few degrees, typically no more than three to five degrees, and this rotation is amplified at contact pad 130. Specifically, the small angle of rotation by drive shaft 123 produces a similar angle of rotation by contact pad 130; however, since the contact pad is radially displaced from the rotation axis, the linear distance it moves during each rotation is greater than the distance moved by the drive shaft. The angle and frequency of drive shaft rotation are directly proportional to the amplitude and frequency, respectively, of the audio signal applied to drive the motor from driver amplifier 25 (FIG. 3).

The embodiment illustrated in FIG. 9 has a number of advantages over the embodiments described above. For example, this embodiment provides a greater tactually sensible amplitude for a given drive signal level because the motor drives a much lower mass than in the previously described embodiments. Specifically, rather than driving the entire case or housing of the unit, the rotor in the FIG. 9 embodiment drives only the user's skin and the rotor's own mass. In other words, the housing is merely a reference, not the vibration-imparting structure; instead the shaft rotation itself serves as the excitation mechanism for the unit. Further, as a consequence of the lower inertia, the device mechanism performs better at the higher end of the frequency range of interest. It will also be appreciated that, by appropriately selecting the stiffness of torsion spring 129, it is possible to adjust the frequency range of maximum amplitude for any given application.

Figure 10:
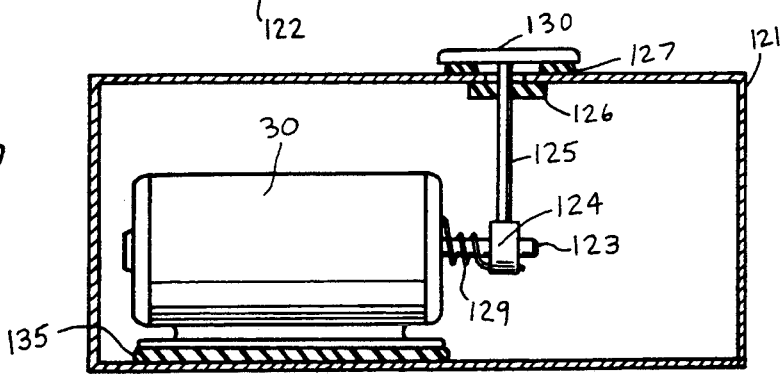
FIG. 10 is a side view in section similar to FIG. 9 but showing the motor mounted on a soft mounting pad.

An alternative to the embodiment illustrated in FIG. 9 is shown in FIG. 10 wherein the rigid mounting for the motor is replaced by a soft or resilient mounting pad 135. In this configuration the mass of motor 30 itself serves as the reference for the motion of skin contactor pad 130. The result is a greater isolation and better local feel for the skin contactor pad than when the motor is rigidly attached to the housing.

In the embodiments of FIGS. 4A, 4B and 8, the rotor of the motor transducer has rotational inertia of significant magnitude compared to the stator and housing mass. Accordingly, a rotational vibratory motion is imparted to the housing such that, if the motor is held in one's hand, or otherwise brought into substantial contact with the body, a vibration is perceived at the skin through the tactile sense. The perceived vibration is a mechanical replication of the spectral components of the applied audio signal in the range between 50 and 800 Hz, approximately, to the extent that the mechanical properties of the motor are able to transmit vibratory motion to the housing, and to the extent that the user's cutaneous tactual sensory system is able to perceive such motion.

As will be clear to one familiar with the dynamics of mechanical systems, simple modifications of the motor or its parts can improve the desired vibratory response of the motor housing to the audio signal. These modifications include, but are not limited to: addition of mass 112 to the rotor, i.e., to the motor drive shaft; addition of mass 115 to the stator, i.e., attaching the mass the housing; raising the resonance of the rotor and stator by addition of a torque spring between the shaft and the motor housing; addition of a torque spring between the shaft and the motor housing in order to better define or constrain the rotor rest position. As will be clear to those familiar with d.c. motors, and as would be suitable in this application where it is not intended that the motor rotate more than a small angle from its rest position, a simple electrical modification, comprising the replacement of motor brushes with wires directly connected to the rotor windings, may likewise be made in order to improve motor reliability.

Figure 11:
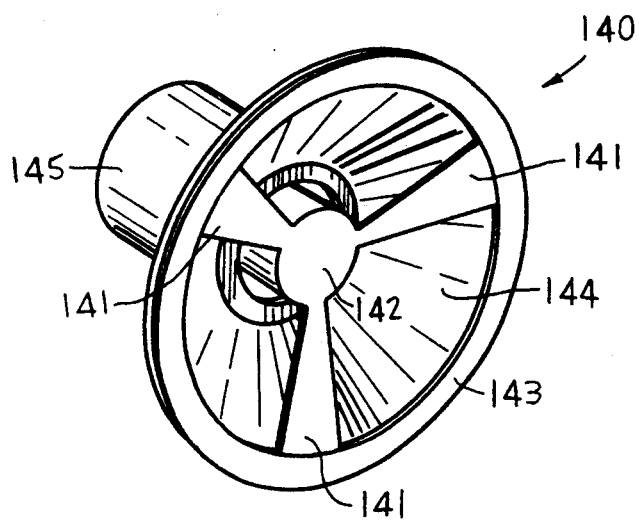
FIG. 11 is a view in perspective of a small loudspeaker modified for use as a transducer in accordance with the present invention.
Figure 12:
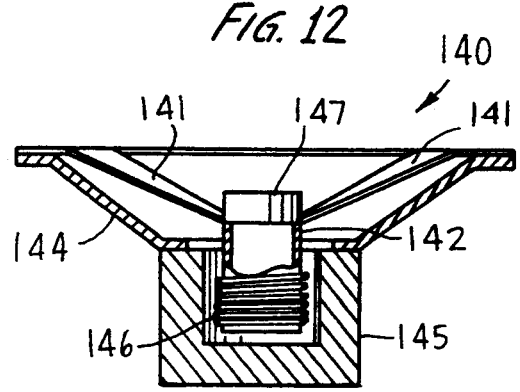
FIG. 12 is a view in transverse section of a loudspeaker similar that shown in FIG. 11 but modified to enhance its low frequency response.
Figure 13:
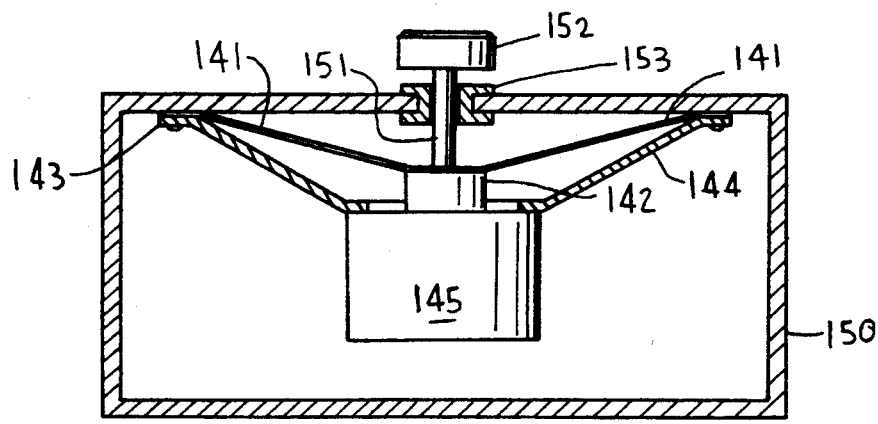
FIG. 13 is a view in section of a loudspeaker transducer mounted in a housing in accordance with the present invention.

In addition to employing a small d.c. or stepping motor as an inexpensive wideband transducer of low frequency audio signals to tactual vibrations, an inexpensive loudspeaker, typically of the permanent magnet moving coil type, may be employed for the same purpose pursuant to the principles of the present invention. Embodiments of the invention employing such a loudspeaker are illustrated in FIGS. 11, 12 and 13 to which specific reference is now made. A conventional loudspeaker 140 is modified by having most of its diaphragm or cone removed except for a plurality of radial strips 141 extending from the speaker armature 142 to the rim 143 of the support spider 144, or other support structure. The number of remaining radial straps 141 is typically three, but there may be four or more such strips as deemed necessary for any particular application. Specifically, the function of the loudspeaker in the present invention is to provide tactually sensible armature vibrations corresponding to an applied low frequency audio signal, not to provide sound waves in air. Accordingly, it is desirable to remove as much of the laminated paper cone as possible to minimize air vibrations (i.e., sound waves) while not interfering with the vibrations of the speaker movement that can be used to provide tactually perceived vibrations. More particularly, the voice coil 146 and armature 142 must remain spaced from the magnet structure so as not to impede armature vibrations. Three equally spaced radial strips 141, each having a width on the order of ten to thirty degrees, provide optimal armature support with minimal sound for most applications; however, other configurations may be suitable to minimize sound without adversely affecting the armature vibrations.

The speaker magnet 145 is a conventional permanent magnet having an annular space between its concentric poles within which the voice coil 146 and armature 142 are disposed to be oscillated axially in that space in response to audio signals applied to the voice coil. The resulting movement of armature 142 with voice coil 146 may be tactually sensed at the skin as vibrations having an amplitude and frequency corresponding to the amplitude and frequency of the applied audio signals.

As illustrated in FIG. 12, a mass 147 may be added to armature 142, appropriately centered in the speaker structure so as not to create unbalance that would cause the armature to rub against the permanent magnet. Mass 147 serves to lower the resonant frequency of the armature structure as may be desired for particular applications.

The loudspeaker transducer may be mounted in a housing 150 in the manner illustrated in FIG. 13. The speaker support rim 143 is secured to an interior surface of a housing wall. An extender arm 151 has a proximal end secured to the speaker armature 142 so as to cause extender arm 151 to reciprocate longitudinally of its own axis in response to armature vibrations. The extender arm 151 projects through a suitable opening in the housing wall and has a tactile contact pad 152 secured to its distal end outside the housing. An annular guide gasket 153 may be disposed in the housing opening about extender arm 151 to protect the speaker by preventing excessive deflection of the voice coil or application of torque thereto as it applies vibratory energy along extender arm 151 to the contact pad 152.

The loudspeaker transducer is more efficient than the d.c. or stepping motor transducer by a factor of approximately five, thereby placing the loudspeaker in the efficiency range of the narrowband vibrators employed in the prior art with wearable devices. For example, at their 250 Hz actuation frequency, the narrowband vibrators require 350 mwatts of power whereas the small motors, at that frequency, require approximately 1.5 watts of power. On the other hand, the loudspeaker, at the same frequency, requires only about 350 mwatts of power to effect similar vibratory excursions. It must be noted, however, that the loudspeaker is much larger and heavier than the narrowband vibrators because of the magnet structure. In addition, the loudspeaker transducer is driven in what may be described as an "open" configuration wherein the vibratory part is in direct contact with the user's skin; the prior art narrowband transducer, on the other hand, is sealed and transmits vibrations inertially through the housing or case. The wideband d.c. or stepping motor transducer of the present invention may be driven in either manner, i.e., either inertially or by direct contact with a vibratory shaft or part.

The loudspeaker transducer, because of its size and shape and its longitudinal or axial vibration mode, is not readily employed in a cylindrical housing that vibrates in the manner illustrated in FIGS. 4A, 4B and 8 for the small motor transducer. Consequently, the most appropriate housing for the loudspeaker transducer is the type illustrated in the FIGS. 5A, 9, 10 and 13 wherein the housing rests on a surface and the user's hand is placed on a vibrating contact pad, or the like.

As noted above, loudspeakers generate sound waves to a much greater extent than the small motor transducers. The sound waves can be significantly minimized by removing large portions of the laminated paper cone as described above. However, since the cone is also used in centering the voice coil in the magnet air gap, it is not possible to remove all of the cone. Of course, one could totally change the speaker design by employing centering springs, etc., but this would compromise an essential advantage of certain applications of the invention, namely low cost. Commercially available inexpensive loudspeakers can, instead, be modified by removing most of the cone at minimal cost.

As will be clear to those skilled in the art of electronics and in the dynamics of mechanical systems, it is necessary to shape the magnitude of the driving audio signal as a function of frequency in accordance with the expected vibratory response characteristics of the particular mechanical system employed. In this regard, and as described above, the mechanical system includes such components as: the motor rotor, stator and housing; the mass of any enclosing packaging; the loudspeaker armature and attached mass; the mass of the underlying tissue of the hand or other body part; and, to a lesser extent, any internal spring constant provided by the magnetic field of the motor. Additionally, since the human tactile sensory system does not exhibit a flat response as a function of frequency (i.e., typically having a maximum perceptual response at approximately 250 Hz with a lesser response both at lower and higher frequencies), additional frequency shaping is usually required. Still further, in view of the fact that the inductive impedance of the driving coil of the motor transducer or the voice coil of the loudspeaker is predominant over either resistive or capacitive impedance components, further shaping of the driving voltage is required whereby, generally speaking, more voltage is required at higher frequencies than at lower frequencies.

In view of all these constraining and guiding requirements, it is clear that the response of the processing circuitry (FIG. 3) to different frequencies driving the motor or loudspeaker transducer in the range between 50 and 800 Hz is significant to obtain proper operation of the system. Hence, it may be understood that an important part of the invention is to include the described processing circuitry of FIG. 3 for amplifying and filtering the audio signal, the circuit characteristics being derived partly in a straight forward manner by analysis depending on the system details, and partly by experimental procedures based on performance requirements, the empirical data being required because of the difficulty in precisely defining all details of systems parameters for this type of human interface system.

Still further, as part of the present invention, and for reasons that will be clear to those of ordinary skill in the arts of speech communication and tactual communication, it is desirable, although not necessarily required, that information be imparted to the user about higher frequency components of the original sound signal, the essential purpose being to provide more distinctive and richer patterns of vibration that better define and differentiate between the differing sound events. Accordingly, and sine the cutaneous tactual sense cannot perceive these higher frequency sound events if they occur much above 800 Hz, and also because the small motor mechanism described above is ineffective in rendering these higher spectral elements into a form felt by the tactual system without some intervening encoding, the high frequency transducer 35 may optionally be included in any or all of the described embodiments of the invention. This requires the inclusion of the higher frequency bandpass filter section 47 in the circuit of FIG. 3, the purpose of which is to separate the higher spectral components of the sound events from the lower frequency components. The detection arrangement 49, 50 is provided whereby the amplitude and temporal characteristics of the separated higher frequency components are determined. Multiplier 61 uses the determined amplitude to control the amplitude of the output signal of oscillator 56. Finally, driver 26 delivers the encoded signal to an appropriate tactual transducer 35. As will be appreciated by those skilled in the art, the requirements for shaping this fixed driving signal as a function of frequency are much reduced from those of the previously described wideband signals since only a fixed signal frequency is tactually presented.

The tactile transducer employed to present the high frequency portion of the thusly transposed audio signal may be either an additional small motor of the type previously described, a loudspeaker of the type previously described, or a more traditional variable reluctance tactile transducer.

To those of ordinary skill in the tactile transducer art it will be apparent that the two tactual signals should not be presented at precisely the same location against the skin; rather, the transducers should be displaced by some small distance in order to enable the user to better appreciate the different portions of the signal components. This characteristic is analogous to processing that takes place in the normal inner ear and is termed "tonotopic mapping".

It will be further apparent to those skilled in the art of tactual transducers that it may be desirable to further divide upper spectral portions of the sound signal into more than one channel, thereby supplying several similarly derived bands of temporal and intensity signals relating to the upper spectral range lying approximately between 800 and 7,000 Hz. Although this results in more clearly defined patterns of signals enabling clearer distinctions between sound events of different qualities, it also increases the cost and complexity of the system. Therefore, whether or not such an approach should be employed depends upon the specific purpose of the system and on factors such as cost constraints. In the case of a system wherein the primary purpose is to impart training information, the advantages of presenting more information via higher resolution divisions within the upper spectral bands may outweigh the additional costs of implementation. In the situation whether the primary purpose is the enhancement of appreciation of television watching, the extra expense and complexity may mitigate against using more than one high frequency channel, or may even best be met by utilizing only the low frequency channel directly driving the small low cost motor or loudspeaker.

From the foregoing description it will be appreciated that the invention makes available a means by which a deaf or hearing impaired person can better appreciate sound information accompanying television programs as well as gain a more accurate and useful appreciation of sound events originating from other sources. This is particularly true if the tactual inputs provided by the system are used in conjunction with other inputs related to the sounds, such as speech reading cues, captioning cues and/or residual hearing cues. Further it will be appreciated that when the present invention is used by a deaf or hearing impaired individual in conjunction with television viewing, it affords an exceptional opportunity for training the individual in the tactile modality, particularly if the viewing is accompanied by other forms of information input regarding the sound events.

It will also be appreciated that the invention makes available a new form of broadband tactual excitation transduction by introducing the use of either small d.c. or stepping motors or loudspeakers as a means for converting audio signals to tactually sensed vibrations, both in the context of television watching and in other applications as well, including communication.

Having described a preferred embodiment of a new and novel method and apparatus for sound responsive tactile stimulation for deaf and hearing impaired individuals for aiding and enhancing their abilities to appreciate sound information from television materials, and for training in the use of the tactile modality for reception of sound events in the context of television reception, and for reception of sound information by deaf and hearing impaired individuals, it is believed that other modifications, variations and changes will be suggested to those skilled in the art in view of the teachings forth herein. It is therefore to be understood that all such variations, modifications and changes are believed to fall in the scope of the present invention as defined by the appended claims.

What is claimed is:

1. Apparatus for providing tactually perceptible vibrations corresponding to sound, said apparatus comprising:

means for providing an electrical audio signal containing a broad band of audio frequency components representing sound events;

signal processing means responsive to said audio signal for passing only low frequency components thereof, said low frequency components including the range of 50 Hz to 800 Hz and excluding at least all frequencies above 2,000 Hz; and wideband tactile transducer means connected to receive said low frequency components from said signal processing means for providing tactually perceptible vibrations at frequencies equal to the low frequency components passed by said signal processing means;

wherein said tactile transducer means comprises a small d.c. or stepping motor having a rotor arranged for alternating movement in opposite directions in response to said received low frequency components to provide said vibrations.

2. The apparatus of claim 1 wherein said rotor is a drive shaft and said alternating movement is rotation of said drive shaft about its own axis, wherein the maximum angle of rotation of said drive shaft in response to said low frequency components is less than ten degrees.

3. The apparatus of claim 2 further comprising a casing on which said motor is rigidly mounted such that said vibrations of said rotor are mechanically transmitted to said casing so as to be tactually perceived by a human hand holding or touching the casing.

4. The apparatus of claim 2 further comprising:
casing means for containing said motor;
a contact member mounted on said housing in a position to be contacted by a finger tip or other part of a human hand; and
vibration transmission means for transmitting vibrations of said rotor to said contact member.

5. The apparatus of claim 4 further comprising means for mounting said motor in said casing to damp mechanical vibrations between said motor and said casing.

6. The apparatus of claim 1 further comprising weighted means for increasing the mass of said rotor.

7. The apparatus of claim 1 wherein said motor includes a stator, and further comprising weighted means for increasing the mass of said stator.

8. Apparatus for providing tactually perceptible vibrations corresponding to sound, said apparatus comprising:
means for providing an electrical audio signal containing a broad band of audio frequency components representing sound events;
signal processing means responsive to said audio signal for passing only low frequency components thereof, said low frequency components including the range of 50 Hz to 800 Hz and excluding at least all frequencies above 2,000 Hz; and
wideband tactile transducer means connected to receive said low frequency components from said signal processing means for providing tactually perceptible vibrations at frequencies equal to the low frequency components passed by said signal processing means;
wherein said tactile transducer means comprises a loudspeaker of the permanent magnet moving coil type having a speaker armature for providing said tactually perceptible vibrations;
wherein said loudspeaker includes a diaphragm vibratable with said armature, and wherein a major portion of said diaphragm is removed to minimize sound waves produced by said diaphragm.

9. The apparatus of claim 8 further comprising:
a casing;
means mounting said loudspeaker in said casing; and
contact means secured to said armature to vibrate therewith and extending out through said casing to permit vibration of said contact means to be tactually perceived by the finger or other body part of a user.

10. Apparatus for providing tactually perceptible vibrations corresponding to sound, said apparatus comprising:
means for providing an electrical audio signal containing a broad band of audio frequency components representing sound events;
signal processing means responsive to said audio signal for passing only low frequency components thereof, said low frequency components including the range of 50 Hz to 800 Hz and excluding at least all frequencies above 2,000 Hz; and
wideband tactile transducer means connected to receive said low frequency components from said signal processing means for providing tactually perceptible vibrations at frequencies equal to the low frequency components passed by said signal processing means;
wherein said tactile transducer means comprises a loudspeaker of the permanent magnet moving coil type having a speaker armature for providing said tactually perceptible vibrations;
and further comprising weighted means secured to said armature for lowering the resonant frequency of said armature.

11. The apparatus of claim 10 wherein said means for providing an electrical audio signal comprises:
a television receiver for receiving a television signal having an audio component, wherein said audio component corresponds to said electrical audio signal; and
transmitting means for transmitting said electrical audio signal to said processing means.

12. Apparatus for providing tactually perceptible vibrations corresponding to sound, said apparatus comprising:
means for providing an electrical audio signal containing a broad band of audio frequency components representing sound events;
signal processing means responsive to said audio signal for passing only low frequency components thereof, said low frequency components including the range of 50 Hz to 800 Hz and excluding at least all frequencies above 2,000 Hz; and
wideband tactile transducer means connected to receive said low frequency components from said signal processing means for providing tactually perceptible vibrations at frequencies equal to the low frequency components passed by said signal processing means;
wherein said means for providing an electrical audio signal comprises:
a television receiver for receiving a television signal having an audio component, wherein said audio component corresponds to said electrical audio signal; and
transmitting means for transmitting said electrical audio signal to said processing means; and
wherein said television receiver is equipped with captioning means for displaying titles representing speech in said audio component.

13. Apparatus for providing tactually perceptible vibrations corresponding to sound, said apparatus comprising:
means for providing an electrical audio signal containing a broad band of audio frequency components representing sound events;
signal processing means responsive to said audio signal for passing only low frequency components thereof, said low frequency components including the range of 50 Hz to 800 Hz and excluding at least all frequencies above 2,000 Hz; and
wideband tactile transducer means connected to receive said low frequency components from said signal processing means for providing tactually perceptible vibrations at frequencies equal to the low frequency components passed by said signal processing means;
and further comprising:

means responsive to said audio signal for passing high frequency components thereof at frequencies above approximately 2,000 Hz; and narrow band transducer means responsive to said high frequency component for providing tactually perceptible vibration at a single frequency with an amplitude related to the amplitudes of said high frequency components.

14. In combination:

a television receiver for receiving television signals having an audio signal component, said television receiver being equipped with captioning means for displaying titles representing speech in said audio signal component; and means responsive to said audio signal component for providing tactile vibrations at frequencies equal to frequency components in said audio signal component over a frequency range including at least 50 Hz to 800 Hz. tactile vibrations at frequencies equal to frequency components in wherein said means for providing tactile vibrations comprises an electrical signal to mechanical vibration transducer, a housing, means mounting said transducer in said housing to damp out vibrations transmitted between the transducer and housing, and contact means secured to said transducer to vibrate therewith and extending outside said housing to transmit said vibrations to a human body portion.

15. In combination:

a television receiver for receiving television signals having an audio signal component, said television receiver being equipped with captioning means for displaying titles representing speech in said audio signal component; and means responsive to said audio signal component for providing tactile vibrations at frequencies equal to frequency components in said audio signal component over a frequency range including at least 50 Hz to 800 Hz;

wherein said means for providing tactile vibrations comprises a small d.c. or stepping motor having a rotor in the form of a drive shaft arranged to rotate alternately in opposite directions in response to said audio signal component, the rotation of said drive shaft being limited to a few degrees in each of said directions.

16. In combination:

a television receiver for receiving television signals having an audio signal component, said television receiver being equipped with captioning means for displaying titles representing speech in said audio signal component; and means responsive to said audio signal component for providing tactile vibrations at frequencies equal to frequency components in said audio signal component over a frequency range including at least 50 Hz to 800 Hz;

wherein said means for providing tactile vibrations comprises a loudspeaker having an armature providing said vibrations in response to said audio signal component.

17. The combination of claim 16 wherein said loudspeaker is a permanent magnet moving coil type loudspeaker, the moving coil being disposed about said armature.

18. The combination of claim 16 wherein said loudspeaker includes a diaphragm vibratable with said armature, and wherein a major portion of said diaphragm is removed to minimize sound waves produced by said diaphragm.

19. In combination:

a television receiver for receiving television signals having an audio signal component, said television receiver being equipped with captioning means for displaying titles representing speech in said audio signal component; and means responsive to said audio signal component for providing tactile vibrations at frequencies equal to frequency components in said audio signal component over a frequency range including at least 50 Hz to 800 Hz;

and further comprising a vibrator responsive to high frequency components in said audio signal above approximately 2,000 Hz for providing tactile vibrations at a single frequency with an amplitude related to the amplitudes of said high frequency components.

20. A method for providing tactually perceptible vibrations corresponding to sound, said method comprising the steps of:

providing an electrical audio signal containing a broad band of audio frequency components representing sound events;

in response to said audio signal, passing only low frequency components thereof, said low frequency components including the range of 50 Hz to 800 Hz and excluding at least all frequencies above 2,000 Hz; and providing tactually perceptible vibrations at frequencies equal to the passed low frequency components;

wherein the step of providing tactually perceptible vibrations includes rotating a small motor drive shaft in alternating directions at frequencies corresponding to the passed low frequency components of said audio signal and through angular displacements representing the amplitudes of said passed low frequency components of said audio signal.

21. The method of claim 20 further comprising the step of transmitting vibrations from rotation of said drive shaft to a casing housing said motor to impart said tactually perceptible vibrations to said casing.

22. The method of claim 20 further comprising the step of transmitting vibrations from rotational movement of the motor drive shaft to a contact member disposed externally of a casing for said motor to cause the contact member to vibrate and be tactually perceived from outside said casing.

23. A method for providing tactually perceptible vibrations corresponding to sound, said method comprising the steps of:

providing an electrical audio signal containing a broad band of audio frequency components representing sound events;

in response to said audio signal, passing only low frequency components thereof, said low frequency components including the range of 50 Hz to 800 Hz and excluding at least all frequencies above 2,000 Hz; and providing tactually perceptible vibrations at frequencies equal to the passed low frequency components;

wherein said step of providing tactually perceptible vibrations includes oscillatorially vibrating the armature of a loudspeaker of the type having a permanent magnet and moving coil;

and further comprising the step of removing a major portion of the vibratable diaphragm of said loudspeaker to minimize soundwave production by said diaphragm.

* * * * *